United States Patent Office 2,710,326
Patented June 7, 1955

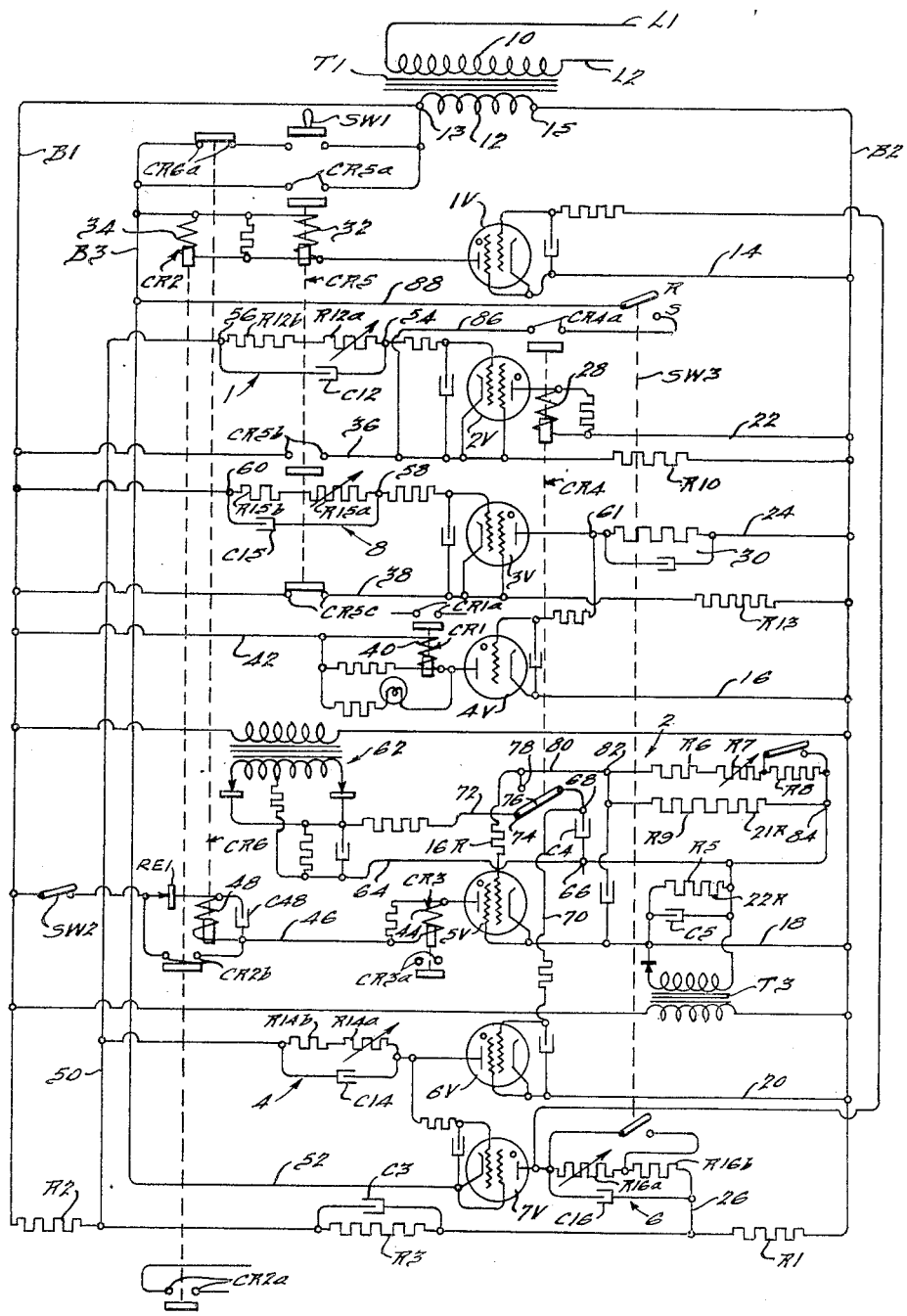

2,710,326

ELECTRICAL CONTROL APPARATUS

Cletus J. Collom, Detroit, Mich., assignor to Weltronic Company, Detroit, Mich., a corporation of Michigan Application February 23, 1951, Serial No. 212,467

24 Claims. (Cl. 219—4)

This invention relates generally to electrical control apparatus and more specifically to such an apparatus in which provision is made for locking out further operation thereof should the circuit controlling the application of electrical potential to the heating or welding electrodes fail in a condition for energizing the electrodes.

An object of this invention is to provide a sequencing network for controlling the various operational steps of a welding apparatus which will lock out in the event of a failure of the circuit controlling one of the steps.

Another object of this invention is to provide such a network which, in the event of failure of the circuit controlling the flow of current to the welding electrodes in a position to continue the supply of potential thereto, will discontinue the application of potential to the electrodes.

Another object is to provide such a network which will lock out and cannot be restarted in the event of such a failure.

A more specific object of the invention is to provide an impedance element in series with the welding current control element which will prevent operation of the welding current control element unless the impedance element is properly by-passed indicating proper operation of the system.

Another object of such invention is to provide such an impedance element which will control a circuit for rendering the network initiating means ineffective in the event of continued energization of the welding current control element.

Other objects of this invention will be apparent from the specification, the appended claims, and the drawing, in which the sole figure thereof diagrammatically shows a welding machine sequencing network embodying the invention.

Other features of the shown sequencing network are described and claimed in my copending application, Serial No. 216,621, filed March 20, 1951, abandoned in favor of continuation application Serial No. 290,550 filed May 28, 1952, and in a copending application of John J. Czaja, Serial No. 212,469, filed February 23, 1951, now U. S. Patent 2,676,230, granted April 20, 1954.

Generically the invention comprises an electrical network comprising valves 1V through 7V which control the various operating functions of a welding machine as, for example, the squeeze time interval, the welding time interval, the hold time interval, the off time interval and the interval during which coolant is supplied to the welding machine. The length of squeeze time is controlled by network 1, the length of the welding time by means of network 2 while the hold time and off time are controlled by the networks 4 and 6, respectively. The sequencing network is operable to initiate the flow of coolant substantially simultaneously with the initiation of operation of the sequencing network and a timing network 8 acts to control the time during which the coolant is permitted to flow subsequent to the completion of a complete sequencing operation of the network. Preferably the time afforded by the network 8 is greater than that of the network 6 so that, when the sequencing network is operated continually, the flow of coolant will not be interrupted but flow of coolant will be interrupted shortly after the use of the sequencing network has been discontinued.

For the interests of simplicity neither the electrical nor the fluid circuit for the coolant has been shown other than the control relay CR1 which controls the stopping and starting of the coolant flow in accordance with the closed or open position of the normally open contacts CR1a. Likewise the fluid circuit and the detailed electrical circuit therefor for controlling the position of the welding electrodes is not shown other than as is shown fragmentarily by the normally open contacts CR2a of the control relay CR2. Similarly the specific circuit controlling the flow of current to the welding electrodes and the welding electrodes themselves are not shown other than by the normally open contacts CR3a of the welding current control relay CR3

The sequencing network receives its energization from a transformer T1 having a primary winding 10 which is connected through suitable switches, not shown, for energization from the lines L1 and L2 which may be connected to any suitable source of alternating current energy. The secondary winding 12 of the transformer has one terminal 13 thereof connected to a bus B1 and its other terminal 15 connected to the bus B2 whereby alternating current electrical potential is applied between the busses. The valves 1V, 4V, 5V and 6V each have their cathodes connected by means of conductors 14, 16, 18 and 20 respectively to the bus B2 while the anodes of the valves 2V and 3V are connected to the bus B2 by conductors 22 and 24 respectively. The anode of valve 7V is connected by a conductor 26 and a resistor R1 to the bus B2. Interposed in series in the conductor 22 is the energizing winding 28 of a control relay CR4, connected in series in the conductor 24 is an impedance network 30, and connected in series in the conductor 26 is the off time network 6.

The anode of the valve 1V is connected through the energizing winding 32 of a control relay CR5 and the winding 34 of the control relay CR2 to a third bus B3, the windings 32 and 34 being parallelly connected with each other. If desired a single relay having the proper number of contacts could be substituted for the shown two relays. The bus B3 is selectively connected to the bus B1 and terminal 13 by means of two parallel circuits, one of these includes the normally open contacts CR5a of the relay CR5, the other includes the normally closed contacts CR6a of the relay CR6 and the normally open contacts of the pilot switch SW1.

The cathode of the valve 2V is connected by means of conductor 36 through the normally open contacts CR5b of the relay CR5 to the bus B1. The cathode of the valve 3V is connected by means of conductor 38 and the normally closed contacts CR5c of the relay CR5 to the bus B1 and is also connected through resistor R13 to the bus B2. The anode of the valve 4V is connected through the energizing winding 40 of the coolant control relay CR1 and conductor 42 to the bus B1. The anode of the valve 5V is connected through the energizing winding 44 of the welding current control relay CR3 to a conductor 46. The conductor 46 is connected to the bus B1 through two parallel circuits, one of which includes the normally open contacts CR2b of the relay CR2 and the other of which includes the energizing winding 48 of the safety control relay CR6 and a rectifier RE1. A capacitor C48 is connected in parallel with the winding 48. A weld-no-weld switch SW2 is connetced in series with both of these parallel circuits so that, if desired, the switch SW2 may be moved to open position and the sequencing network run through a sequencing operation without actually providing for the flow of welding current.

The anode of the valve 6V is connected through the hold time network 4 to a conductor 50 which is connected through a resistor R2 to the bus B1. The cathode of the valve 7V is connected by a conductor 52 to the bus B3. As shown, the resistor R2 is connected between the conductor 50 and the bus B1 and the resistor R1 between the bus B2 and the conductor 26. In order to establish a potential of the conductors 50 and 26 with respect to the busses B1 and B2 respectively, a third resistor R3 is connected in series between the resistors R1 and R2. If desired, a capacitor C3 may be arranged in shunt relation with the resistor R3 to phase shift the voltage which appears across resistors R1 and R2 so that the control voltages provided thereby lead the anode voltages of the respective valves.

The controlling grid of the valve 2V is connected through the usual grid current controlling resistor to one terminal 54 of the squeeze time network 1. The other terminal 56 of this network is connected to the bus 50. The control grid of the valve 3V is connected through the usual grid current controlling resistor to one terminal 58 of the network 8, the other terminal 60 of which is connected to the bus B1. The controlling grid of the valve 4V is connected through the usual grid current controlling resistor to the common terminal 61 between the network 30 and the anode of the valve 3V. The controlling grid of valve 7V is connetced through the usual grid current controlling resistor to the common terminal between the hold time network 4 and the anode of the valve 6V.

The control bias applied between the grid to cathode of the valves 5V and 6V is derived from a chargeable capacitor C4 which, in the normal position of the relay CR4, is maintained fully charged from a rectifying network 62 which is energized by the potential appearing between the busses B1 and B2. The negative output bus 64 of the network 62 is connected to the negative terminal 66 of capacitor C4 which is connected through parallelly connected resistor R5 and capacitor C5 to the conductor 18 and cathode of valve 5V.

The positive output bus 72 of the network 62 is connected to one contact 74 of a single pole double throw switch actuated by the relay CR4 and having a movable arm 76 engageable with the contact 74 when the relay CR4 is de-energized and engageable with a contact 78 when the relay CR4 is energized. The arm 76 is directly connected to the positive terminal 68 of the capacitor C4. A conductor 80 connected through the usual grid to current controlling resistor to the grid of the valve 5V is connected to the contact 78 and to one terminal 82 of the weld time network 2. The other terminal 84 of the network 2 is connected to the bus 64 and thereby to the negative terminal 66 of the capacitor C4. The network 2 comprises one or more series connected resistors R6, R7 and R8 having parallelly connected therewith the resistor R9. One or more of the resistors R6, R7 and R8 may be adjustable for determining the length of time required to discharge the capacitor C4.

Normally a unidirectional substantially constant potential is maintained across the resistor and capacitor R5, C5 by the transformer T3 having its primary winding connected between the busses B1 and B2. The polarity of the potential so applied by the transformer T3 is in a direction to maintain a negative grid to cathode or blocking bias voltage on the valve 5V.

The positive terminal 68 of the capacitor C4 is continually connected by means of conductor 70 and the usual grid current controlling resistor to the grid of the valve 6V. In this instance it will be noted that the cathode of the valves 5V and 6V are of the same potential each being directly connected to the bus B2.

It is believed that the remaining details of construction may best be understood from a description of operation of the network which is as follows:

Upon energization of the winding 10 of the transformer T1, the winding 12 will establish an alternating potential between the busses B1 and B2. The valve 3V will immediately commence to conduct establishing a circuit from the bus B2 through the network 30, the valve 3V, the normally closed contacts CR5c, and the conductor 38 to the bus B1. This will establish a voltage differential across the network 30 which is applied between the grid and cathode of the valve 4V maintaining it blocked and the relay CR1 de-energized. The network 62 will also be energized to establish a positive to negative voltage between the busses 72 and 64 which due to the now de-energized condition of the relay CR4 will be applied to charge the capacitor C4.

The valve 5V will be held in a nonconductive condition by the voltage established across the resistor and capacitor R5, C5 by the transformer T3 which was energized concurrently with energization of the busses B1 and B2 so that even though the weld-no-weld switch SW2 is in its normally closed position as shown, the relays CR3 and CR6 will remain de-energized. The charged condition of the capacitor C4 will overcome the blocking bias voltage afforded by the transformer T3 between the grid and cathode of the valve 6V which valve will then be in a conductive condition and current will flow from the bus B1 through the resistor R2, the conductor 50, the hold time network 4, the valve 6V and conductor 20 to the bus B2. Such flow of current through the valve 6V establishes a potential across the network 4 which is applied as a blocking potential between the grid and cathode of the valve 7V which will hold this valve blocked when its anode-cathode circuit is completed. At the same time current for charging the network 1 will flow from the bus B1 through the resistor R2, conductor 50, the network 1, grid to cathode conduction in the valve 2V and through the resistor R10 to the bus B2. This flow of current will place a charge across the capacitor C12 of the network 1.

When it is desired to initiate the operation of the welding apparatus, the switch SW1 is momentarily closed connecting the bus B3 to the bus B1 completing the anode-cathode circuits for the valves 1V and 7V. Since the valve is biased into a nonconductive condition above set forth, it will not conduct and there will be no potential established across the network 6 to bias the valve 1V into a nonconductive condition. Therefore upon closure of the switch SW1, as soon as the bus B3 becomes positive with respect to the bus B2, current will flow therefrom through the windings 32 and 34, the valve 1V, and conductor 14 to the bus B2. This energizes the relay CR2 and CR5 closing the contacts CR2a, CR2b, CR5a, and CR5b and opening the contacts CR5c.

Closure of the contacts CR5a establishes a holding circuit by-passing the manually operable initiating switch SW1 so that it may be subsequently released without interfering with the sequence of operation which has then been initiated. Closure of the contacts CR5b transfers the potential of the cathode of the valve 2V from substantially that of the bus B2 to that of the bus B1 thereby terminating any further flow of charging current to the capacitor C12 of the network 1. The network 1 which has been maintaining the valve 2V in a nonconductive condition begins to discharge through the discharge resistors R12a and R12b. Opening of the contacts CR5c opens the anode-cathode circuit of the valve 3V terminating further energization of the network 30 and transferring the potential of the cathode of the valve 3V from that of the bus B1 to substantially that of the bus B2. Transferring of the potential of the cathode of the valve 3V permits a charging current to flow from the bus B1 through the network 8, grid to cathode conduction in the valve 3V, and resistor R13 to the bus B2. Closure of the contacts CR2a completes a circuit for the usual ram mechanism, not shown, whereby the electrodes, not shown, are moved against the workpiece, not shown. Closure of the contacts CR2b is without immediate effect since at this time the valve 5V is nonconductive as above described.

De-energization of the network 30, which occurs rapidly, removes the blocking bias voltage between the grid and cathode of the valve 4V which then begins to conduct causing current to flow from the bus B1 through conductor 42, winding 40 of relay CR1, valve 4V and conductor 16 to the bus B2. Energization of the relay CR1 closes the contacts CR1a thereof to start the flow of coolant to the welding machine, not shown.

At the end of a predetermined time interval subsequent to closure of the switch SW1, the capacitor C12 will have discharged sufficiently through the resistors R12a and R12b to remove the blocking bias potential between the grid and cathode of the valve 2V which then conducts establishing a circuit between the bus B2 through conductor 22, winding 28 of the relay CR4, valve 2V, conductor 36, and the now closed contacts CR5b to the bus B1. Energization of the relay CR4 moves its switch arm 76 out of engagement with the contact 74 and into engagement with the contact 78 whereby the capacitor C4 is disconnected from the charging network 62 and connected to its discharging network 2.

Connection of the capacitor C4 with its discharge network 2 places the potential existing across the capacitor C4 and the resistor R9 in opposition to the blocking potential appearing across the resistor and capacitor R5, C5 raising the potential of the grid of valve 5V relative to the cathode potential of the valve 5V sufficiently to permit the valve 5V to conduct. Conduction of the valve 5V closes a circuit from the bus B1 through the now closed contacts CR2b, conductor 46, winding 44 of the relay CR3, valve 5V and conductor 18 to the bus B2. Upon energization, the relay CR3 closes its contacts CR3a to cause current to flow between the electrodes which have now been clamped against the work. Any suitable control circuit actuated upon closure of the contacts CR3a may be used to control the flow of welding current between the welding electrodes and therefore the details of this circuit have been omitted in the interest of simplicity.

The capacitor C4 is now discharging through the resistors R6 to R9 and after a predetermined time interval which is the welding time interval, the charge across the capacitor C4 will decrease sufficiently so that the blocking potential provided by the resistor and capacitor R5, C5 will overcome the unblocking potential of the capacitor C4 whereby the valves 5V and 6V will be rendered nonconductive. Rendering of the valve 5V nonconductive de-energizes the relay CR3 permitting its contacts CR3a to open and to terminate the flow of welding current between the welding electrodes. Rendering of the valve 6V nonconductive terminates further charging of the capacitor C14 of the network 4 which then begins to discharge through the resistors R14a and R14b for measuring out the hold time or time period in which the electrodes are held against the workpiece subsequent to termination of the flow of welding current and prior to the withdrawal of the electrodes from the workpiece.

At the end of this predetermined time period, the charge across the capacitor C14 will have decreased sufficiently so that the unblocking potential supplied by the resistor R2 will overcome the blocking potential supplied by the network 4 and the valve 7V will then commence to conduct. Conduction of the valve 7V establishes a circuit from the bus B2 through the resistor R1, the network 6, valve 7V, conductor 52, bus B3, closed contacts CR5a to the bus B1. This establishes a voltage drop across the network 6 which is applied between the grid and cathode of the valve 1V rendering this valve nonconductive.

Rendering of the valve 1V nonconductive de-energizes the windings 32 and 34 whereby the relays CR5 and CR2 open their normally open contacts CR5a, CR5b, CR2a and CR2b and close the normally closed contacts CR5c. Opening of the contacts CR2a de-energizes the circuit controlling the clamping of the electrodes permitting the ram mechanism, not shown, to move the electrodes away from the work. Opening of the contacts CR2b is without immediate effect due to the now nonconductive condition of the valve 5V. Opening of the contacts CR5a opens the by-pass holding circuit around the switch SW1 and the contacts CR6a. Assuming that the switch SW1 has been maintained closed, the opening of the contacts CR5a will be without effect. If, however, the switch SW1 has been opened, opening of the contacts CR5a de-energizes the bus B3. Opening of the contacts CR5b transfers the potential of the cathode of the valve 2V from that of the bus B1 to substantially that of the bus B2 permitting a recharging of the capacitor C12 of the network 1.

Closure of the contacts CR5c transfers the potential of the cathode of the valve 3V from substantially that of the bus B2 to that of the bus B1 terminating further flow of charging current to the capacitor C15 of the network 8 thereby causing the capacitor C15 to discharge through the resistors R15a and R15b. After a predetermined time interval the charge across the network 8 will be reduced sufficiently so that the valve 3V will again conduct establishing a potential across the network 30 which is applied as a blocking potential between the grid and cathode of the valve 4V blocking this valve and permitting the contacts CR1a of the relay CR1 to open and terminate further flow of coolant to the welding apparatus.

If it is assumed that the switch SW1 was opened prior to timing out of the off time network 6, opening of the contacts CRa opens the anode circuit for the valve 7V terminating further energization of the network 6 whereby its now charged capacitor C16 commences to discharge through the resistors R16a and R16b. At the end of a predetermined period known as the off time, the blocking bias potential between the grid and cathode of the valve 1V will be removed. However, since switch SW1 was opened prior to the timing out of the network 6, this is without effect. If, however, the switch SW1 is still maintained closed, timing out of the network 6 will initiate a new sequencing cycle, as above described. Normally the network 8 will not be adjusted to time out prior to the timing out of the network 6 and the initiation of a new cycle of operation will occur prior to the reconduction of the valve 3V and blocking of the valve 4V to de-energize the coolant control relay CR1 to terminate further coolant flow.

As just described, the sequencing network will continue to sequence the welding apparatus just as long as the switch SW1 is maintained closed. If it is desired to sequence the welding apparatus through only one welding cycle irrespective of how long the switch SW1 is maintained closed, the single-repeat switch SW3 is moved from the shown R position to the S position. Such a positioning of switch SW3 will not interfere with the normal timing afforded by the condensers C4 and C14 to measure out the weld time and hold time intervals nor the timing function of the network 8 for controlling the flow of coolant. Such positioning of the switch SW3 permits energization of the relay CR4 and consequent closure of its contacts CR4a to establish a holding circuit around the contacts CR5b to connect the cathode of the valve 2V through conductor 86, the closed contacts CR4a, the single-repeat switch SW3 and conductor 88 to the bus B3 so that the valve 2V will remain conductive as long as the switch SW1 or contacts CR5a are closed. With such a holding circuit, the establishment of a potential across the off time network 6 and consequent blocking of the valve 1V will not cause an interruption in the circuit for the winding 28 of the relay CR4. As long as the relay CR4 is maintained energized, condenser C4 cannot be recharged and after the condenser C4 discharges, as above described, in connection with repeat operation to cause the valves 5V and 6V to block, the valves 5V and 6V will remain nonconductive. As long as valve 6V is nonconductive, valve 7V will conduct to maintain the network 6 energized and the valve 1V blocked.

In order to reset the sequencing network for a subsequent operation, it is necessary to momentarily open the switch SW1 which terminates further conduction of the valve 7V and permits the relay CR4 to open its contacts CR4a since the circuit therethrough is broken by the opening of switch SW1. With the single-repeat switch in its single operative position, it shorts out the resistor R16a permitting the capacitor C16 to discharge very rapidly through the resistor R16b affording subsequently no off time interval. An almost immediate reclosure of the switch SW1 will therefore start a new sequencing operation.

Let us first assume that for some reason or other the valve 5V loses control and becomes conductive during an interval in which the switch SW1 is open and the network is not performing a sequencing operation. Under such conditions, the relay CR2 will be de-energized so that its contacts CR2b will be open. The current flow between the busses B1 and B2 therefore will flow through the windings 48 and 44 in series. The winding 48 has such a high impedance that with the voltage applied between the busses B1 and B2, the winding 44 is held below a minimum predetermined value at which the relay CR3 will not act to close its contacts CR3a. Therefore the electrodes cannot be energized. Energization of the winding 48 in this manner will actuate the relay CR6 and open the contacts CR6a thereof. Opening of the contacts CR6a renders the closure of switch SW1 ineffective to connect the bus B3 with the bus B1 since the switch SW1 and the contacts CR6a are in series with each other between the busses B1 and B3. Therefore the welding apparatus cannot be sequenced with a defective valve 5V or some other type of short circuit whereby the windings 48 and 44 are serially energized between the busses B1 and B2.

Let us now suppose that the valve 5V becomes shorted or otherwise goes out of control and into a conducting condition during the time interval subsequent to energization of the relays CR2 and CR5. Under such operating conditions, the relay CR6 will not be energized since its winding 48 is shunted by means of the now closed contacts CR2b. However as soon as the sequence network has completed a sequencing operation and the off time network 6 has become energized to block the valve 1V, the relays CR2 and CR5 will move to a de-energized position opening the contacts CR2b connected in shunt with the winding 48 and inserting the winding 48 of the relay CR6 in series circuit with the winding 44. This reduces the degree of energization of the relay CR3 so that the contacts CR3a move to open position terminating further flow of electrical energy to the electrodes. Energization of the relay CR6 also caused the contacts CR6a to open so that the switch SW1 is ineffective to connect the busses B1 and B3. In a normal system and consideration the worst condition in which the valve 5V failed just at the instant the valve 1V commenced to conduct, it will amount to only a relative short time during which current will flow through the electrodes E and will not permit too serious damage to the welding apparatus.

What is claimed and is desired to be secured by United States Letters Patent is as follows:

1. In a sequencing network, a plurality of interrelated circuits for controlling a sequence of operations, one of said circuits including an energizable element for initiating one of said operations in response to the existence of a current flow through said element of a predetermined magnitude, an impedance element having a current capacity less than said predetermined magnitude connected in series with said energizable element, switch means operable in one position to shunt said impedance element, means operable as a consequence of another of said circuits being rendered effective to exert another of said operations for actuating said switch means to said one position.

2. In a sequencing network, a plurality of interrelated circuits for controlling a sequence of operations, one of said circuits including an energizable element for initiating one of said operations in response to the existence of a current flow through said element of a predetermined magnitude, a relay having an energizable winding with a current capacity less than said predetermined magnitude connected in series with said energizable element, switch means operable in one position to shunt said impedance winding, means operable as a consequence of another of said circuits being rendered effective to exert another of said operations for actuating said switch means to said one position, means for initiating an operation of said circuits, and means actuated by said relay upon energization of said winding for rendering said initiating means ineffective to initiate an operation of said circuits.

3. In a sequencing network for controlling the steps of operation of a welding apparatus having a movable welding electrode with actuatable apparatus for moving such electrode into welding position and an energizing circuit for such electrode, a first circuit for controlling the actuation of such apparatus, means for initiating an energization of said first circuit, a second circuit having an energizable control element operable in an energized condition to actuate an electrode energizing circuit, a safety device connected in said second circuit and operable to render said second circuit ineffective to energize said electrode energizing circuit, and means operable as a consequence of the actuation of said first circuit for rendering said safety device ineffective.

4. In a sequencing network, a plurality of interrelated circuits for controlling a sequence of operations, means for initiating the operation of said circuits, a safety device associated with one of said circuits and operable to render said one circuit ineffective to control the one of said operations normally controlled thereby, and means actuated as a consequence of the operation of said initiating means for rendering said safety device ineffective to render said one circuit ineffective.

5. In a sequencing network, a plurality of interrelated circuits for controlling a sequence of operations, means for initiating the operation of said circuits, a safety device associated with one of said circuits and operable to render said one circuit ineffective to control the one of said operations normally controlled thereby, and means actuated by another of said circuits for rendering said safety device ineffective to render said one circuit ineffective.

6. In a sequencing network, a plurality of interrelated circuits for controlling a sequence of operations, means for initiating the operation of said circuits, a safety device associated with one of said circuits and operable to render said one circuit ineffective to control the one of said operations normally controlled thereby, and means actuated by a prior actuated one of said circuits for rendering said safety device ineffective to render said one circuit ineffective.

7. In an electrical sequencing network for controlling the sequencing of a plurality of operations, a plurality of interrelated sequentially operated circuits, one of said circuits including an electric valve having main electrodes and the energizing windings of a pair of relays, said electrodes and said windings being connected in series circuit, the one of said windings of one of said relays having an impedance substantially greater than the other of said windings of the other of said relays, said other relay being operable upon actuation to control one of said operations, means providing a potential across said series connected electrodes and windings of a magnitude that said other relay is rendered ineffective to control said operation, means operable as a consequence of the operation of another of said sequencing circuits for effectively removing said first winding from said series circuit.

8. The combination of claim 7 in which said one relay is effective upon energization of said one winding to render said network ineffective.

9. The combination of claim 8 in which is provided means for initiating a sequencing operation of said circuits and said one relay renders said initiating means ineffective.

10. In a controlling network, a plurality of sequentially controlled circuits, each said circuit including an electric valve, each said valve having a pair of main electrodes and a control electrode, a first of said circuits including an anode circuit the conductivity of which is controlled by its respective said valve and by a first control device, said first circuit being rendered in a first conductive condition when its said valve and said control device are both in a first operating condition and held in its second conductive condition when either its said valve or said control device are in a second operating condition, a second of said circuits including an anode circuit the conductivity of which is controlled by said second circuit valve, said second circuit anode circuit including an impedance network, circuit means for applying a potential which is a function of the potential appearing across said impedance network between said control electrode and one of said main electrodes of said first circuit valve, potential applying means for applying a potential between said control electrode and one of said main electrodes of said second circuit valve and normally acting to maintain said second circuit in a first conductive condition whereby the potential across said network holds said first circuit valve in its said first operating condition, a third of said circuits including a second control device the energization of which is controlled as a function of the conductive condition of said third circuit valve, said third circuit further including a third device for controlling the energization of said second device, said second device being rendered in a first condition solely when both said third device and said third circuit valve are in a first operating condition, a pair of means responsive to the operating condition of said first circuit for controlling respectively the operating condition of said third device between its said second condition and a first condition and for controlling the potential between said control electrode and one of said main electrodes of said third circuit valve whereby the operating condition of said third circuit valve is controlled between its said first condition and a second condition.

11. In a controlling network, a plurality of sequentially controlled circuits, each said circuit including an electric valve, each said valve having a pair of main electrodes and a control electrode, a first of said circuits including an anode circuit the conductivity of which is controlled by its respective said valve and by a first and a second control device, said first circuit being rendered in a first conductive condition solely when its said valve and said control devices are all in a first operating condition and held in its second conductive condition when any of its said valve or said control devices are in a second operating condition, a second of said circuits including an anode circuit the conductivity of which is controlled by said second circuit valve, said second circuit anode circuit including an impedance network, circuit means for applying a potential which is a function of the potential appearing across said impedance network between said control electrode and one of said main electrodes of said first circuit valve, potential applying means for applying a potential between said control electrode and one of said main electrodes of said second circuit valve and normally acting to maintain said second circuit in a first conductive condition whereby the potential across said network holds said first circuit valve in its said first operating condition, a third of said circuits including a third control device the energization of which is controlled as a function of the conductive condition of said third circuit valve, said third circuit further including a fourth device for controlling the power available to energize said third device, said fourth device acting to regulate the power supplied to said third device and having a first operating condition in which power of at least a predetermined minimum magnitude is supplied to said third device when said third circuit valve is in a first operating condition and having a second operating condition in which power below said predetermined magnitude is supplied to said third device when said third circuit valve is in said first operatng condition, said fourth device being operatively connected to actuate said second device and effective to render said second device in its said second condition as a consequence of the rendering said fourth device in its said second condition and said third circuit valve in its said first condition, a pair of means responsive to the operating condition of said first circuit for controlling respectively the operating condition of said fourth device and the potential between said control electrode and one of said main electrodes of said third circuit valve.

12. In a controlling network, a plurality of sequentially controlled circuits, each said circuit including an electric valve, each said valve having a pair of main electrodes and a control electrode, a first of said circuits including an anode circuit the condictivity of which is controlled by its respective said valve and by a first and a second control device, said first circuit being rendered in a first conductive condition solely when its said valve and said control devices are all in a first operating condition and held in its second conductive condition when any of its said valve or said control devices are in a second operating condition, a second of said circuits including an anode circuit the conductivity of which is controlled by said second circuit valve, said second circuit anode circuit including an impedance network, circuit means for applying a potential which is a function of the potential appearing across said impedance network between said control electrode and one of said main electrodes of said first circuit valve, potential applying means for applying a potential between said control electrode and one of said main electrodes of said second circuit valve and normally acting to maintain said second circuit in a first conductive condition whereby the potential across said network holds said first circuit valve in its said first operating condition, a third of said circuits including a third control device the energization of which is controlled as a function of the conductive condition of said third circuit valve, said third circuit further including a fourth device for controlling the power available to energize said third device, said fourth device acting to regulate the power supplied to said third device and having a first operating condition in which power of at least a predetermined minimum magnitude is supplied to said third device when said third circuit valve is in a first operating condition and having a second operating condition in which power below said predetermined magnitude is supplied to said third device when said third circuit valve is in said first operating condition, said fourth device being operatively connected to actuate said second device and effective to render said second device in its said second condition as a consequence of the rendering said fourth device in its said second condition and said third circuit valve in its said first condition, a pair of means responsive to the operating condition of said first circuit for controlling respectively the operating condition of said fourth device and the potential between said control electrode and one of said main electrodes of said third circuit valve, and means operable as a consequence of the rendering of said third circuit valve conductive to de-energize said potential applying means whereby said second circuit valve is rendered conducting to energize said impedance network.

13. In a sequencing apparatus, a plurality of interrelated networks for controlling a sequence of operations, one of said networks including a normally conductive but not conducting electric valve having an anode circuit, said anode circuit including a first device energizable as a consequence of the conduction of said valve and a second and a third current controlling device connected in series circuit with said valve, said second device being normally maintained in a condition to interrupt said anode circuit and said third device being normally maintained in a condition to close said anode circuit, a second of said networks including an electric valve having an anode circuit, said second valve anode circuit including a fourth and a fifth device energizable as a consequence of the conduction of said second valve, said fourth and fifth devices being connected in series, said second network including a shunt circuit around said fourth device, said first device including current controlling means positioned to control current flow through said shunt circuit, said first device means being operable when said first device is energized to close said shunt circuit, and means operatively connecting said fourth device to said third device, said fourth device when energized being effective to actuate said third device to open said first network anode circuit.

14. In a sequencing apparatus, a plurality of interrelated networks for controlling a sequence of operations, one of said networks including a normally conductive but not conducting electric valve having an anode circuit, said anode circuit including a first device energizable as a consequence of the conduction of said valve and a second and a third current controlling device connected in series circuit with said valve, said second device being normally maintained in a condition to interrupt said anode circuit and said third device being normally maintained in a condition to close said anode circuit, a second of said networks including an electric valve having an anode circuit, said second valve anode circuit including a fourth and a fifth device energizable as a consequence of the conduction of said second valve, said fourth and fifth devices being connected in series, said second network including a shunt circuit around said fourth device, said first device including current controlling means positioned to control current flow through said shunt circuit, said first device means being operable when said first device is energized to close said shunt circuit, means operatively connecting said fourth device to said third device, said fourth device when energized being effective to actuate said third device to open said first network anode circuit, and means initiating a change in the conductivity of said second network valve as a consequence of the change in conductivity of said one network.

15. In a sequencing timer; a first circuit including a first main circuit controller having first and second controlling conditions, a first auxiliary circuit controller having first and second controlling conditions, and a first energizable actuator; said first controllers being arranged in said first circuit whereby said first energizable actuator may be rendered in a first condition solely when both said controllers are in their respective said first conditions and be rendered into a second condition when either of said first controllers are in their respective said second conditions; a second circuit including a second main circuit controller having first and second controlling conditions, a second auxiliary circuit controller having first and second controlling conditions, a second energizable actuator, and terminals for controlling an output circuit; said second controllers being arranged in said second circuit whereby said terminals may be energized to actuate said output circuit solely when both said controllers are in their respective said first conditions and ineffective to energize said terminals for actuation of said output circuit when either of said second controllers are in their respective said second conditions; means operatively connecting said first actuator with said second auxiliary circuit controller whereby said second auxiliary controller is actuated to its said first condition as a consequence of the rendering of said first energizable actuator to its said first condition and vice versa; means operatively connecting said second actuator with said first auxiliary circuit controller whereby said first auxiliary controller is actuated to its said second condition as a consequence of the rendering of said second energizable actuator into its said first condition in response to the actuation of said second main circuit controller.

16. The combination of claim 15 in which said second controllers and said terminals are connected in series and said second actuator is connected in shunt with said second auxiliary controller and in which the current flow through said second actuator is less than the current flow required to actuate a load device connected between said terminals.

17. In a sequencing timer; a first circuit including a first main switch having first and second controlling conditions, contacts of a first relay movable between first and second controlling conditions, and a winding of a second relay; said switch contacts and said first relay contacts being arranged in said first circuit whereby said second relay winding may be rendered in a first condition solely when said contacts of both said switch and said first relay are in their respective said first conditions and be rendered into a second condition when either said first switch or said first relay contacts are in their respective said second conditions; a second circuit including a second main switch having normally open circuit controlling contacts, contacts of said second relay movable between open and closed positions, a winding of said first relay, and a control device requiring at least a minimum current flow for actuation thereof; said second switch contacts and said second relay contacts and said control device being in series and said first relay winding being connected in shunt with said second relay contacts; said first relay winding having sufficient impedance to reduce the current flow through said second circuit to a value less than said predetermined minimum whereby said control device will remain nonactuated unless both said second switch contacts and said second relay contacts are closed.

18. The combination of claim 17 in which there is provided a time delay mechanism operatively connected to said first circuit for actuation thereby as a consequence of the rendering of both said switch and said first relay contacts into their respective said first conditions, said mechanism being operatively connected to control said second main switch and effective to close said second main switch as a consequence of an actuation of said time delay mechanism.

19. In a sequencing timer; a first circuit including in series circuit a normally open switch, an energizable winding of a first relay, and normally closed contacts of a second relay; and a second circuit including in series circuit a pair of principal electrodes of an electric valve, and an energizing winding of said second relay; said second circuit also including a pair of normally open contacts of said first relay arranged in shunt circuit with respect to said winding of said second relay.

20. The combination of claim 19 in which said valve includes a control electrode, in which a bias circuit is connected between one of said principal electrodes and said control electrode and is normally effective to maintain said valve nonconductive, and means responsive to the closure of said switch for controlling said bias circuit to cause a conducting bias potential to be placed between said control electrode and said one principal electrode.

21. In a control network, a pair of circuits, one of said circuits including a control device requiring power of at least a predetermined magnitude for actuation of said device and a power regulating device connected in series with said control device for controlling the magnitude of the power supplied to said control device, said one circuit having a first controlling means operative to control the energization and de-energization of said one circuit, said power regulating device having a normal condition in which the power available to said control device is less than said predetermined magnitude as a consequence of the energization of said one circuit by said controlling means, said power regulating device having a second operating condition in which said control device is provided with power of at least said predetermined magnitude as a consequence of the energization of said one circuit by said controlling means, a second controlling means controlling the energization of the other of said circuits, and means operatively connecting said power regulating device and said first controlling means to said other circuit for actuation as a consequence of a change in energization of said other circuit, said last-introduced means being effective as a consequence of the actuation of said second controlling means to place said power regulating device in its said second condition and to place said first controlling means in condition to energize said one circuit.

22. The combination of claim 21 in which said last-introduced means includes a time delay mechanism which interconnects said other circuit with said first controlling means, said time mechanism being effective to time out a delay interval as a consequence of the actuation of said other circuit by said second controlling means, said timing mechanism thereafter being effective to place said first controlling means in its actuated condition.

23. In a control network, a pair of circuits, one of said circuits including a control device requiring power of at least a predetermined magnitude for actuation of said device and a power regulating device connected in series with said control device for controlling the magnitude of the power supplied to said control device, said one circuit having an electronic valve normally operative to control the initiation and termination of power flow through said one circuit, said power regulating device having a normal condition in which the power available to said control device is less than said predetermined magnitude as a consequence of conduction of said valve, said power regulating device having a second operating condition in which said control device is provided with power of at least said predetermined magnitude as a consequence of the conduction of said valve, a second controlling means controlling the energization of the other of said circuits, and means operatively connecting said power regulating device and said valve to said other circuit for actuation as a consequence of a change in energization of said other circuit, said last-introduced means being effective as a consequence of the actuation of said second controlling means to place said power regulating device in its said second condition and to render said valve conductive to energize said one circuit.

24. In a control network, a pair of circuits, one of said circuits including a control device requiring power of at least a predetermined magnitude for actuation of said device and a power regulating device connected in series with said control device for controlling the magnitude of the power supplied to said control device, said one circuit having an electronic valve normally operative to control the initiation and termination of power flow through said one circuit, said power regulating device having a normal condition in which the power available to said control device is less than said predetermined magnitude as a consequence of conduction of said valve, said power regulating device having a second operating condition in which said control device is provided with power of at least said predetermined magnitude as a consequence of the conduction of said valve, a second controlling means controlling the energization of the other of said circuits, means operatively connecting said power regulating device and said valve to said other circuit for actuation as a consequence of a change in energization of said other circuit from a first to a second condition, said last-introduced means being effective as a consequence of the actuation of said second controlling means to place said power regulating device in its said second condition and to render said valve conductive to energize said one circuit, and timing means responsive to the change in energization of said other circuit from its said first to its said second condition for subsequently returning said other circuit to its said first condition.

References Cited in the file of this patent

UNITED STATES PATENTS

| | | |
|---|---|---|
| 1,171,254 | Ruckle | Feb. 8, 1916 |
| 1,552,321 | Lea | Sept. 1, 1925 |
| 1,726,163 | Powell | Aug. 27, 1929 |
| 1,867,225 | Le Van et al. | July 12, 1932 |
| 2,246,324 | Schroder | June 17, 1941 |
| 2,341,526 | Breitenstein | Feb. 15, 1944 |
| 2,422,020 | Kingsmill | June 10, 1947 |
| 2,444,209 | Pond et al. | June 29, 1948 |
| 2,518,118 | Bivens | Aug. 8, 1950 |
| 2,552,137 | Bivens | May 8, 1951 |
| 2,600,941 | Undy | June 17, 1952 |